United States Patent [19]

Koch, Jr.

[11] 4,075,893

[45] Feb. 28, 1978

[54] RADIALLY MOVING TRIGGER MECHANISM AND TRANSMISSION OVERSPEED INHIBITOR USING SAME

[75] Inventor: Franklin O. Koch, Jr., Edelstein, Ill.

[73] Assignee: Caterpillar Tractor Co., Peoria, Ill.

[21] Appl. No.: 661,087

[22] Filed: Feb. 25, 1976

[51] Int. Cl.² .................. F16H 5/42; F16H 25/08; F16H 53/00; G01P 3/18
[52] U.S. Cl. .............................. 74/3; 74/55; 74/567; 73/534; 73/548
[58] Field of Search .............. 74/3, 64, 55, 567; 73/539, 551, 534, 548; 192/103 FA, 104 F, 87.12; 137/53

[56] References Cited

U.S. PATENT DOCUMENTS

| 589,335 | 8/1897 | Caldwell | 74/3 X |
|---|---|---|---|
| 640,971 | 1/1900 | Stewart | 74/3 |
| 678,418 | 7/1901 | Murphy | 73/548 X |
| 1,074,879 | 10/1913 | London | 74/3 X |
| 1,148,318 | 7/1915 | Hewitt | 73/551 X |
| 1,230,481 | 6/1917 | Guthrie | 73/551 X |
| 1,666,458 | 4/1928 | Leland | 73/551 |
| 2,167,590 | 7/1939 | Slaugenhop | 73/534 |
| 2,396,361 | 3/1946 | Browne | 192/87.12 X |

Primary Examiner—Samuel Scott
Assistant Examiner—Carl F. Pietruszka
Attorney, Agent, or Firm—Phillips, Moore, Weissenberger, Lempio & Majestic

[57] ABSTRACT

The invention comprises a trigger mechanism providing stepwise linear motion responsive to a shaft rotating above a predetermined rate. The trigger mechanism comprises a rotating shaft having a collar thereabout attached to rotate therewith. Also part of the mechanism are a plurality of arcuate cams mounted within the collar to rotate therewith, each biased with the ends of the arcs thereof adjacent the collar at a normal shaft rotation rate of no more than said predetermined rate and the midpoints of the arcs thereof spaced away from the collar towards the shaft. The midpoints of the arcs are forced centrifugally to adjacent the collar when the shaft rotates above said predetermined rate (at overspeed). Each cam has a channel therein and fits against a respective adjacent cam end to end to form a generally circular arrangement thereof, said circular arrangement defining a first circular path therein at a normal shaft rotation rate up to said predetermined rate a first radial distance from said shaft and a second circular path therein at a second radial distance above said predetermined shaft rotation rate. The mechanism further includes non-rotating cam-follower means having a tang extending therefrom into said first circular path at said normal shaft rotation rate and into said second circular path above said predetermined shaft rotation rate, said cam-follower means constrained to shift laterally responsive to said tang shifting from a respective one to a respective other of said first and second circular paths and providing a pair of detent positions separated by a distance generally equal to said lateral shift a first of which is further from said shaft and a second of which is closer to said shaft. Also part of the trigger mechanism is a rod having a first end extending outwardly from said cam-follower means away from said shaft and a second end biased against a respective one of said first and second detent positions indexing said tang in said first circular path at said normal shaft rotation rate and in said second circular path at said predetermined shaft rotation rate.

7 Claims. 5 Drawing Figures

Fig_3

RADIALLY MOVING TRIGGER MECHANISM AND TRANSMISSION OVERSPEED INHIBITOR USING SAME

BACKGROUND OF THE INVENTION

1. Field of the Invention

The invention is concerned primarily with an improvement in a drive transmission of the gear type which couples an engine to a driven load at any selected one of a plurality of drive ratios. Most particularly, the invention is concerned with such a drive transmission wherein both the input clutch and the output clutch of said drive transmission are fluid operated by an automatic operating control means. Specifically, the invention provides a trigger mechanism which operates an overspeed inhibitor coupled to the control means and the output clutch for overriding the control means by changing the pressure of fluid applied to the output clutch when the input shaft rotates above a preselected rate. Further, the invention is concerned with the particular trigger mechanism utilized and with the use of said particular trigger mechanism in a drive transmission to serve as the actuator in such an overspeed inhibitor and in other situations as well.

2. Prior Art

Multi-speed drive transmissions are well known to the prior art. More particularly drive transmissions for powered vehicles and the like which have change speed gears which may be shifted to provide a selected one of a plurality of drive ratios and have clutches at both the input and output end thereof whereby the gears may be decoupled from both the driving engine and the driven shaft and may then be braked to a stop to facilitate shifting are known. In such apparatus brakes are generally provided at both the input and output ends of the gearing section and a fluid control system, generally a fast acting pneumatic control system is provided which responds to movement of the operators shift lever by automatically operating the clutches and brakes in a programmed sequence which assures smooth shifting and avoids damage. Thus it is known to provide such a drive transmission wherein on movement of the operator shift lever to a selected setting the control system simultaneously disengages both clutches and applies both brakes. The control system then energizes fluid operated means for making the appropriate gear interconnections and then sequentially releases the input brake and the output brake. The input clutch is engaged and finally the output clutch is engaged to re-establish a driving connection between the engine and the driven elements. The delay between release of the input and output brakes assures that abutting teeth in the gearing section engage easily at relatively low speeds and under only light loading. Such systems are described in great detail in each of U.S. Pat. Nos. 3,508,450; 3,667,538; and 3,667,309 which are assigned to the assignee of the present application. The description in said three United States Patents is hereby incorporated herein by reference thereto.

A problem can arise in drive transmissions for coupling an engine to a driven load such as for example those transmissions described in detail in the above referenced patents due to erroneous movement of the shift lever to signal a transmission ratio change which would seriously overspeed the transmission and the engine. Similarly, engine and transmission overspeeding can be caused by a malfunction of the control apparatus for the transmission. For example, the basic concept of the transmissions of the above discussed patents relies on shifting from one speed ratio to another with all internal rotation stopped. Because of this, transmission and engine overspeeding can be caused by improper ratio selection. That is, with all internal rotation stopped the transmission can be shifted into any drive ratio be it proper or improper. Then, when the transmission engages as by brake release and clutch engagement the transmission and engine can suddenly be accelerated into an overspeed condition. This is clearly a serious problem which can deleteriously affect both the transmission and the engine. The present invention is concerned with use of a centrifugal trigger device which causes the drive connection to be slipped until the speed of the input shaft of the transmission reduces to an acceptable level and then re-engages the connection. The connection which is slipped and then re-engaged is the output clutch at the rear of the transmission since this serves to slip the drive connection to both the transmission and the engine.

SUMMARY OF THE INVENTION

In one sense, the invention comprises an improvement in a drive transmission for coupling an engine to a driven load at any selected one of a plurality of drive ratios which comprises a gear section having an input shaft, an output shaft, a plurality of gears and shift means for interconnecting said gears in any of a plurality of predetermined relationships to provide said plurality of drive ratios, fluid pressure operated clutch means for coupling said gear section input shaft to said engine having an engaged position and disengaged position, fluid pressure operated output clutch means for coupling said driven load and said gear section output shaft having an engaged position and a disengaged position and automatic operating control means for applying fluid pressure to said output clutch. The improvement of the invention comprises an overspeed inhibitor coupled to said control means and said output clutch for overriding said control means by changing the pressure of fluid applied to said output clutch and means responsive to said input shaft rotating above a predetermined rate for causing said overspeed inhibitor to override said control means.

In another sense, the invention comprises a trigger mechanism providing stepwise linear motion responsive to a shaft rotating above a predetermined rate. The mechanism comprises a rotating shaft having a collar thereabout attached to rotate therewith. The mechanism further comprises a plurality of arcuate cams mounted within said collar to rotate therewith, each normally biased with the ends of the arcs thereof adjacent said collar and the mid points of the arcs thereof spaced away from said collar towards said shaft, said mid points of said arcs being forced centrifugally to adjacent said collar when said shaft rotates above a predetermined rate, each of said cams defining a channel therein and fitting against a respective adjacent cam end to end to form a generally circular arrangement thereof, said circular arrangement defining a first circular path therein at a normal shaft rotation rate up to said predetermined rate a first radial distance from said shaft and a second circular path therein at a second radial distance above said predetermined shaft rotation rate. Also part of the mechanism is non-rotating cam-follower means having a tang extending therefrom into said first circular path at said normal shaft rotation rate and into said second circular path above said predetermined shaft rotation rate, said cam-follower means being constrained to shift laterally responsive to said tang shifting from a respective one to a respective other of said first and second circular paths and a pair of detent positions separated by a distance generally equal to said lateral shift a first of which is further from said shaft and a second of which is closer to said shaft. Also part of the trigger mechanism is a rod having a first end extending outwardly from said cam means away from said shaft, said first end of said rod providing said stepwise linear motion and a second end biased against a respective one of said first and second detent positions indexing said tang in said first circular path at said normal shaft rotation rate and in said second circular path at said predetermined shaft rotation rate.

BRIEF DESCRIPTION OF THE DRAWINGS

The invention will be better understood by reference to the figures of the drawings wherein like numbers denote like parts throughout and wherein.

DETAILED DESCRIPTION OF THE PREFERRED EMBODIMENT

Figure 1:
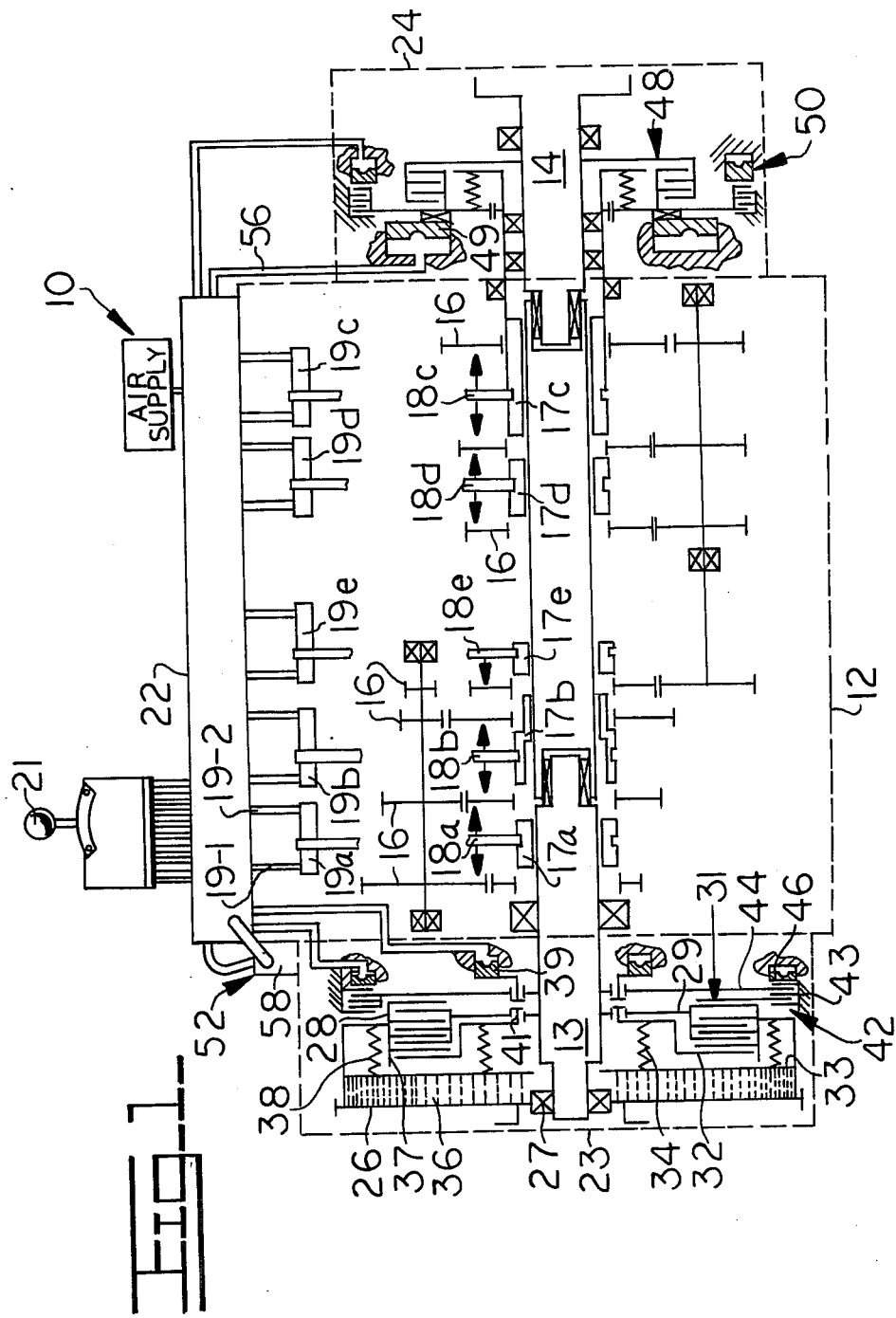
FIG. 1 is a schematic diagram of a vehicle transmission embodying the invention.

Referring initially to FIG. 1 of the drawings, a transmission 10 in accordance with the invention may include a speed gear section 12 of the known form described in U.S. Pat. No. 3,508,450. Such a gear section has an input shaft 13 extending from the front end and an output shaft 14 extending from the back end and includes a plurality of change speed ratio gears 16 which may be interconnected in different patterns by shifting a series of clutch collars 17a–17e to provide any of a predetermined plurality of drive ratios between the input and output shafts. In the particular gearing section illustrated in FIG. 1, sixteen forward speeds, neutral and two reverse speeds may be realised by shifting appropriate combinations of five clutch collars 17a to 17e, suitable detailed mechanical structure for such a change speed gear section 12 being described in the above-identified patent. Each shift collar 17a to 17e is manipulated by an associated shift fork 18a to 18e, respectively, which is in turn operated by an associated individual one of five air pressure controlled actuator cylinders 19a to 19e respectively. The actuators 19a–19e may be essentially of the form described in detail in U.S. Pat. No. 3,620,047 for Shift Fork Mechanism for Drive Transmissions assigned to the assignee of the present invention. Actuators of this form have two air pressure ports 19-1 and 19-2 and if pressurized air is supplied to port 19-1 while venting port 19-2 the associated fork 18 and clutch collar 17 is moved in a first axial direction. Pressurizing of port 19-2 and venting of port 19-1 shifts the fork and clutch collar in the opposite direction. Reference to U.S. Pat. No. 3,667,309 assigned to the assignee of the present application illustrates the particular ports of actuators 19a to 19e which are pressurized to realize the sixteen forward speeds, neutral and two reverse speeds provided in this specific gear section 12, it being apparent that the invention is applicable to transmissions having different arrangements of change speed gears 16 and different numbers of shift means actuator 19 for providing different numbers of speed ranges.

Referring again to FIG. 1, appropriate ones of the actuators 19 are energized to establish a selected speed ratio in response to movement of an operators shift initiating lever 21 by a pneumatic shift control circuit 22 which is also described in full detail in said U.S. Pat. No. 3,667,309.

In the transmission 10 as shown in FIG. 1, a change of drive ratio in the gearing section 12 requires that one or more of the toothed clutch collars 17 be disengaged from a toothed ratio gear 16 and that one or more of the shift collars be engaged with others of the ratio gears. Further, no bulky conventional synchronizer means are present to facilitate these operations. This is made possible in a transmission of this form in that both the gearing section input shaft 13 and output shaft 14 are decoupled from the driving engine and driven load respectively at the beginning of the shift transient and the gears 16 are braked to a stop or near stationary condition before being shifted. Following operation of the shift actuators 19, the input shaft 13 and output shaft 14 are recoupled to the driving engine and driven load respectively to re-establish drive through the transmission. An input decoupler section 23 performs a decoupling, braking and recoupling functions at input shaft 13 in response to pressure signals from control circuit 22 and an output coupler section 24 performs the similar functions at output shaft 14 also in response to pressure signals from the control circuit.

The input coupler section 23 may include a flywheel 26 disposed coaxially with respect to gear section input shaft 13 and journaled for rotation thereon by a suitable bearing 27, the flywheel 26 being adapted for connection to the driving engine of the associated vehicle or the like. The flywheel 26 carries a sleeve section 28 and within the sleeve section an annular hub 29 is disposed coaxially on input shaft 13 for rotation therewith. A disc input clutch 31 provides for engagement or disengagement of the flywheel 26 with the hub 29, alternate ones of the clutch discs being splined to the flywheel sleeve section 28 and the intervening ones of the clutch disc being splined to the hub.

Input clutch 31 is engaged and disengaged by axial movement of an annular pressure plate 32. To exert a force on the pressure plate 32 tending to engage input clutch 31 a piston plate 33 is disposed coaxially around input shaft 13 and is movable relative thereto in an axial direction. A series of compression springs 34 act between piston 33 and pressure plate 32 to urge the pressure plate in a direction tending to engage the input clutch 31. Smooth shifting of a transmission of this general form requires a modulated engagement of the input clutch 31 when starting up from start to avoid severe torque mismatches. In the more common form of mechanical transmission, this clutch modulation requires careful manipulation of a clutch pedal on the part of the operator. In the transmission 10, the desired input clutch modulation is realised automatically by providing a volume of oil 36 between flywheel 26 and piston 33, the oil being trapped therebetween by centrifugal effects which tends to urge the liquid radially outward with respect to the axis of rotation of the flywheel and piston. Under this condition the oil volume 36 exerts an axial pressure against piston 33 which is a function of the angular velocity of the oil volume and which is thus a function of engine speed. Accordingly the force which piston 33 exerts on input clutch pressure plate 32 through springs 34 is modulated as a function of the speed of the driving engine to produce a desired gradual input clutch engagement during a start up. The optimum variation of clutch engagement pressure with engine speed varies according to such factors as the form of driving engine which is used, the nature of the driven load, input clutch capacity and the like. The present example of the invention was designed for use in a highway truck having a diesel engine wherein the modulation of clutch capacity is preferrably confined to the lower range of engine speeds and clutch capacity should be held substantially constant as higher engine speeds are reached. Accordingly, movement of piston 33 in response to increased pressure in oil volume 36 is limited at a predetermined point by contact of the piston plate with a stop 37 carried by the sleeve section 28 of flywheel 26. Once the engine speed increases to the point where the piston plate 33 contacts stop 37, the engagement pressure on input clutch 31 is thereafter determined solely by the force of springs 34 and is therefore relatively contant.

In order to shift the piston plate 33 in a direction which relieves the engagement pressure on input clutch 31 when the engine speed drops to idling speed or below, a series of disengagement springs 38 act between the sleeve section 28 of the flywheel 26 and the pressure plate in opposition to the centrifugally generated force of oil volume 36 thereon. Thus at low idling speeds input clutch 31 is effectively disengaged as springs 38 relieve the force of pressure plate 32 on the clutch. As engine speed increases the centrifugally generated force of oil volume 36 overcomes the force of springs 38 and shifts piston plate 33 in a direction which tends to engage the input clutch 31 and the rate of engagement is modulated as a function of engine speed up to a predetermined point after which the clutch capacity is held essentially contant. No operator manipulation of a clutch pedal or the like is required for this purpose. The transmission gear section input shaft 13 is automatically decoupled from the driving engine at any time when engine speed drops below a predetermined point and is automatically recoupled as engine speed increases except during forced disengagement in connection with selection of a different speed ratio.

To accomplish a speed ratio change of the transmission 10, it is necessary that the input clutch 31 be temporarily forced to a disengaged condition without regard to engine speed. For this purpose the input coupler section 23 includes a front clutch piston 39 which may be shifted by a fluid pressure signal from control circuit 22 and which then bears against clutch plate 32, through a series of pins 41 to force disengagement of the clutch. Release of pressure from behind piston 39 enables the clutch to re-engage.

Following disengagement of input clutch 31 in preparation for a speed ratio change, it is necessary that the ratio gears 16 be brought to a stop or near stationary condition. This is accomplished in part by an input brake 42 located in input decouple section 23. Brake 42 has alternate discs splined to the housing 43 of the transmission with the intervening discs being splined to an annular hub 44 coupled to gear section input shaft 13 for rotation therewith. A front brake piston 46 is responsive to fluid pressure from control circuit 22 to compress the disc brake assembly 46 and thereby stops rotation of the gear section and input shaft 13.

The output coupler section 24 of the transmission 10 may be for example identical to the equivalent section as described in U.S. Pat. No. 3,667,309. For the purposes of the present invention it is sufficient to note that the output coupler section 24 of the transmission shown in FIG. 1 of the present invention includes an output clutch 48 controlled by a fluid pressure signal from control circuit 22 to an output clutch piston 49 and an output brake 50 likewise fluid pressure controlled from control circuit 22, both of which are associated with the output drive shaft 14.

It is clear that the basic concept of the transmission 10 comprises shifting from one speed ratio to another with all internal rotation brought to a stop or near stationary condition. Because of this, motion of the shift lever 21 is generally limited by a mechanical inhibitor as taught for example in U.S. Pat. No. 3,863,520 commonly assigned herewith to prevent the operator from making a shift of more than one or two ratio steps at one time. This patent discloses a device having an override feature that the operator can use when appropriate. However, operator error in using the override feature or control malfunction can lead to shifting into any of the available sixteen forward gears. Hence, on engagement of the input and output clutches and gears transmission and engine overspeeding can be caused due to improper gear ratio selection.

Figure 2:
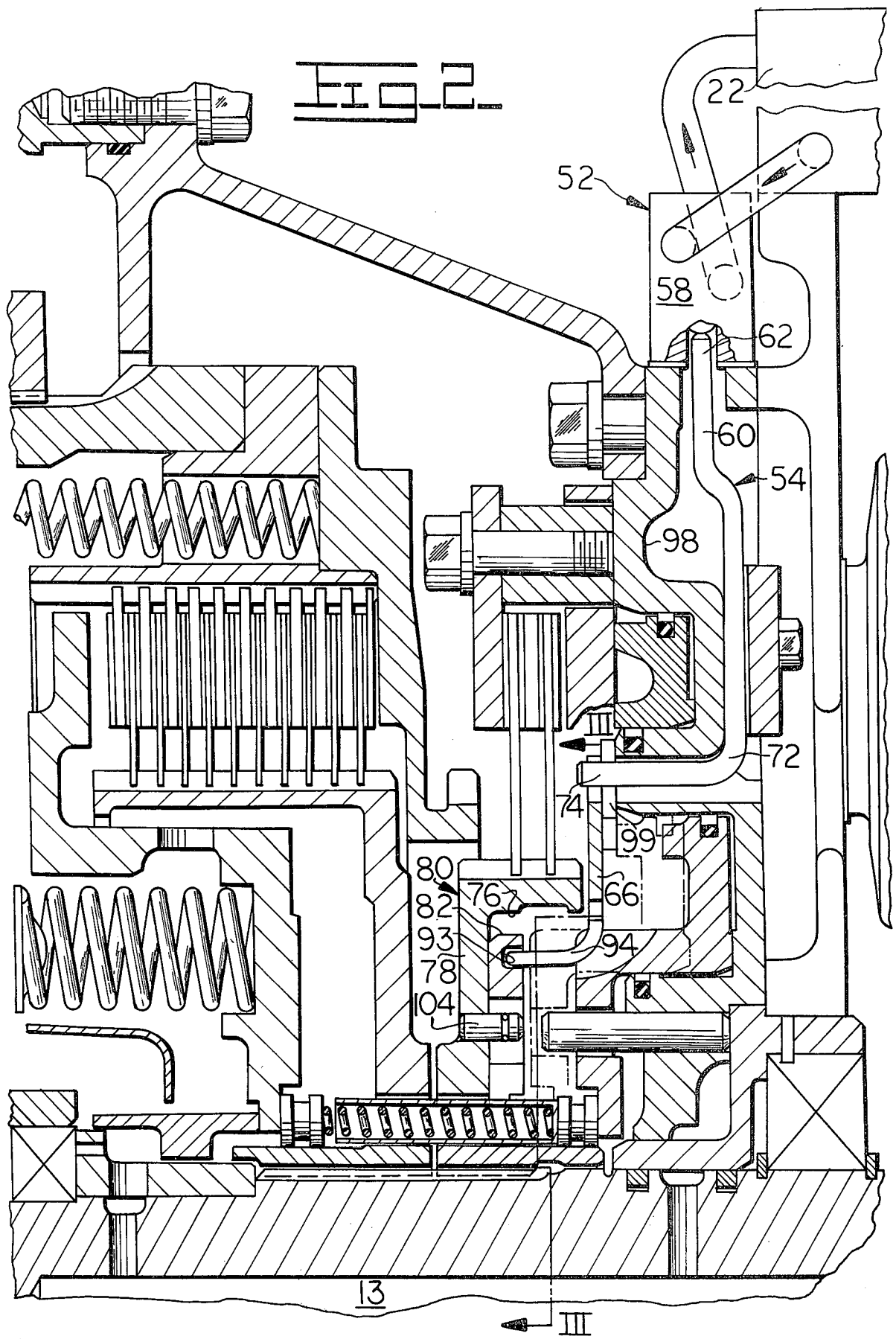
FIG. 2 is a partial axial section view of the upper left hand portion of the input clutch shown on the left side of FIG. 1.
Figure 3:
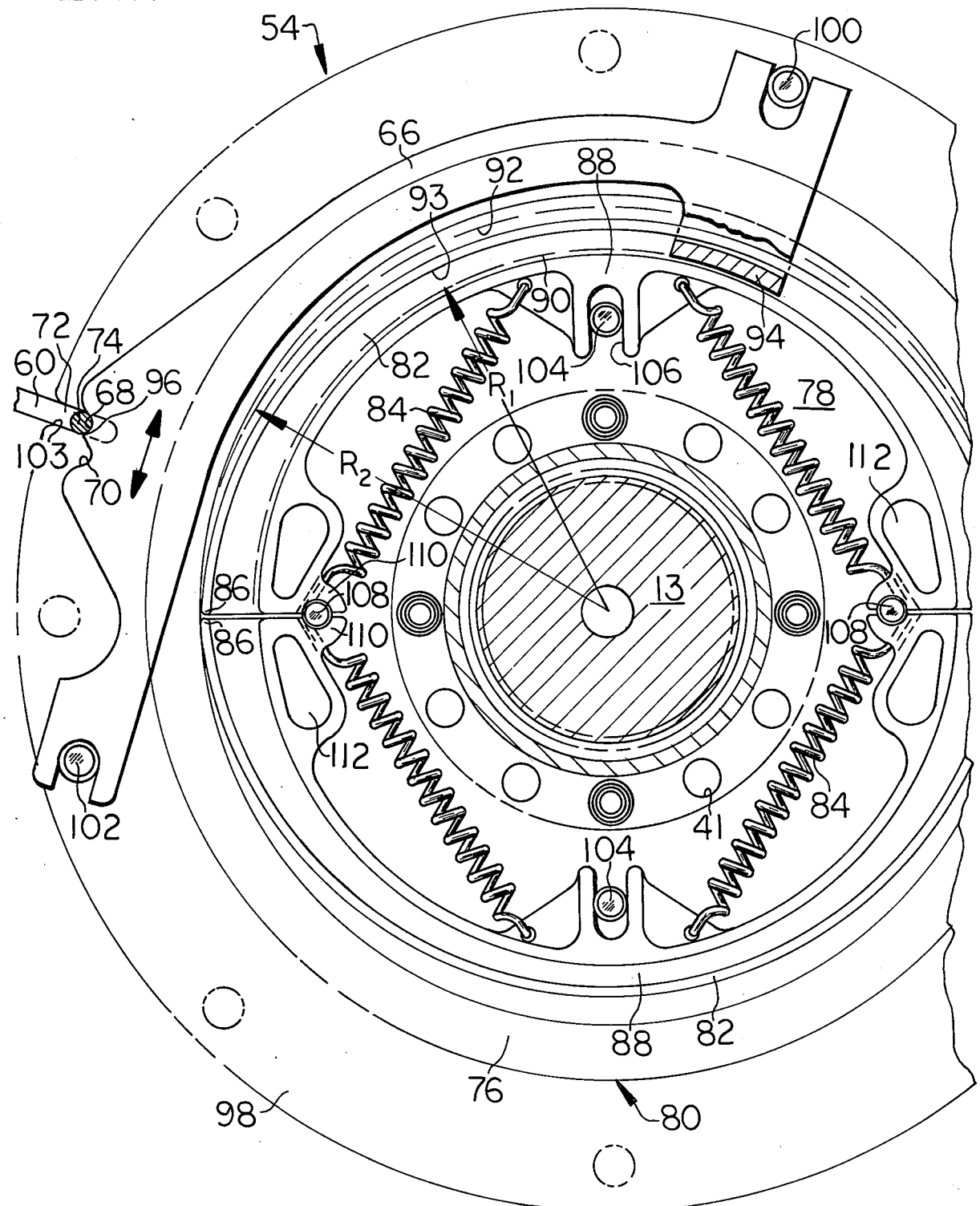
FIG. 3 is a section view through the centrifugally actuated trigger mechanism of the present invention taken generally along the lines III—III of FIG. 2.

To protect the engine and transmission against damage from transmission and engine overspeeding, an overspeed inhibitor 52 illustrated most clearly in FIGS. 2 and 3 and coupled to the control means, e.g., the shift control pneumatic circuit 22 and to the output clutch 48 serves to override said shift control pneumatic circuit 22 by changing the pressure of fluid, e.g., air, applied to the output clutch 48. Trigger means 54 are provided responsive to the input shaft 13 rotating above a predetermined rate for causing the overspeed inhibitor 52 to override the pneumatic shift control circuit 22.

It will be apparent that the pneumatic shift control circuit 22 comprises output clutch valve means and the output clutch 48 normally engages on application of fluid pressure thereto via a conduit 56 shown in FIG. 1 which communicates with the pneumatic shift control circuit 22.

Figure 4:
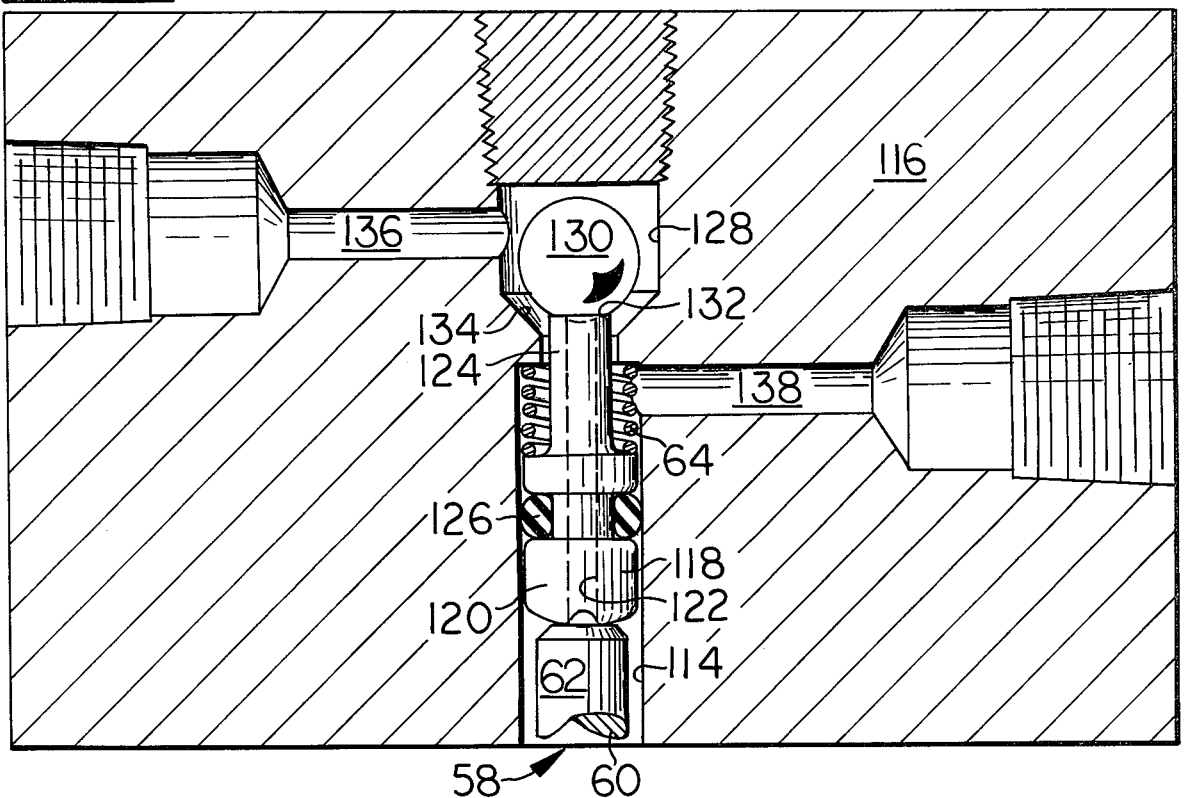
FIG. 4 is an enlarged sectional view of the pilot valve assembly wherein the air supply to the rear or output clutch flows from the pneumatic shift control circuit to the output clutch.
Figure 5:
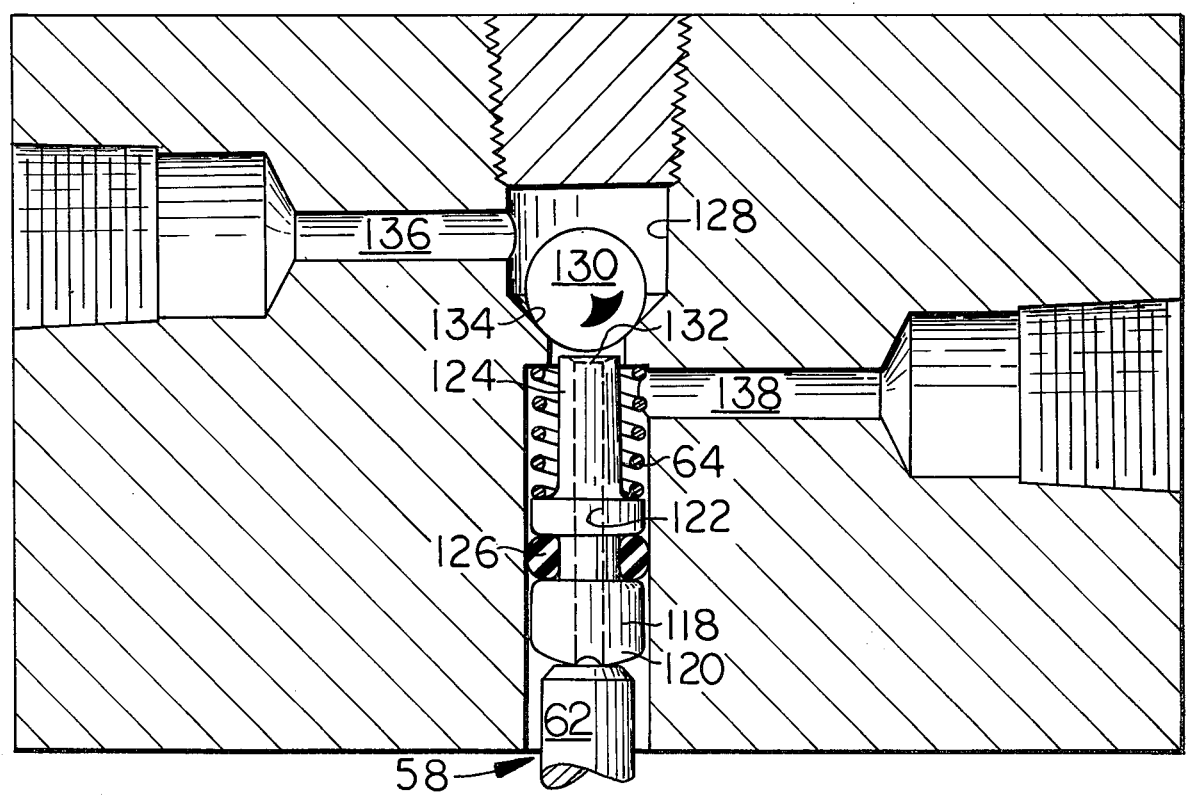
FIG. 5 is an enlarged section view of the pilot valve assembly wherein the air supply is shut off and the output clutch is exhausted.

The overspeed inhibitor 52 includes a two position valve means or more particularly a two position valve 58 illustrated in detail in FIGS. 4 and 5. Valve 58, which is shown in its position for normal speeds in FIG. 4 (supply port open to clutch port, and exhaust port blocked), serves to vent the fluid pressure normally applied to output clutch 48 when overspeed occurs and valve 58 is forced into the position as shown in FIG. 5 (supply port blocked and clutch port open to exhaust). The predetermined rate of input shaft 13 rotation corresponds to an overspeed rate of rotation.

Referring now most particularly to FIGS. 2 and 3 the structure of the trigger mechanism of the present invention will become more apparent. Briefly the overspeed responsive trigger means 54 comprises a rod 60 which extends from the valve 58 towards the input shaft 13. A first end 62 of the rod 60 opens the valve 58, in a manner which will be explained in detail later, when the input shaft 13 rotates above the above-mentioned overspeed rate.

Turning now to FIGS. 4 and 5 for a moment it will be seen that the rod 60 is biased towards the input shaft 13 by a spring 64.

Referring again to FIGS. 2 and 3 it will be seen that the overspeed responsive means 54 further comprises non-rotating cam-follower means, namely the non-rotating cam follower 66, said cam follower 66 providing a pair of detent positions 68 and 70 which alternately contact the rod 60 adjacent a second end 72 thereof. More particularly, the first position 68 and the second position 70 on the cam follower 66 alternately contact an arm 74 which proceeds generally at right angles from the second end 72 of the rod 60. The first position 68 of the pair of positions as will be noted by reference to FIG. 3 is further from the input shaft 13 and corresponds as will become apparent from the following explanation to a normal (non-overspeed) input shaft rotation rate. The second position 70 of the pair of positions is closer to the input shaft 13 and corresponds to the overspeed rate of the input shaft rotation.

It will be apparent that the overspeed responsive means 54 further comprises a collar 76 which together with a flange 78 forms a drum 80. The collar 76 fits about the input shaft 13 and is attached thereto via the flange 78 to rotate therewith. A plurality, or more particularly in the preferred embodiment, a pair, of arcuate cams 82, usually made of tough self lubricating plastic such as Nylon, (Trademark of E.I. DuPont de Namours) are mounted within the collar 76 and against the flange 78 so as to rotate with the collar 76. Each of the arcuate cams 82 is normally biased by a pair of springs 84 with the ends 86 of the arcs of the cams 82 adjacent the collar 76 and the mid points 88 of the arcuate cams 82 spaced away from the collar 76 towards the input shaft 13. As the input shaft 13 rotates faster and faster and finally starts rotating above the overspeed rate the mid points 88 of the arcuate cams 82 are forced centrifugally to adjacent the collar 76. The overspeed rate is thus preselected or predetermined by the strength chosen for the springs 84. It will be noted that each of the cams 82 fits against the adjacent cam end to end to form a general circular arrangement thereof. The circular arrangement of the arcuate cams 82 aligns a varying width channel 93 therein to define a first circular path 90 as shown by a dashed line in FIG. 3 at the normal input shaft rotation rate, in the configuration specifically illustrated in FIG. 3 at a first radial distance $R_1$ from the center of the input shaft 13 and a second circular path 92 also indicated by a dashed line in FIG. 3 at a second and larger radial distance $R_2$ when the input shaft 13 rotates at said overspeed rotation rate. FIG. 2 illustrates the cams 82 in position to define the first circular path 90 within the varying width channel 93 in the cams 82. This corresponds to normal shaft rotation. At overspeed the cam 82 shifts outwardly to abut the collar 76 and thereby the channel 93 defines the second circular path 92.

The non-rotating cam follower 66 includes a tang 94 extending therefrom generally at right angles thereto and biased by the spring 64 acting on the rod 60 so that said tang 94 is held in the first circular path 90 at the normal input shaft rotation rate and in the second circular path 92 at the overspeed input shaft rotation rate. As is apparent from FIG. 3 the pair of positions of the non-rotating cam follower 66 comprises a pair of adjacent indentations, namely, the first position 68 and the second position 70 in the cam follower 66 separated by a rounded apex 96 therebetween. In this manner it is clear that the rod 60 will sit stably in one of the positions 68 and 70 and will be shifted positively from one of said positions 68 and 70 to the other thereof responsive to movement of the pair of arcuate cams 82 from the position where they define the first circular path 90 to the position where they define the second circular path 92. This provides basically two positions for the rod 60. Attached to a stationary ring 98 and more particularly upraised therefrom is a first pin 100 and a second pin 102. The pins 100 and 102 serve as means for constraining the cam follower 66 to shift laterally adjacent the first position 68 and the second position 70 a distance generally equal to the separation of said pair of positions responsive to the tang 94 shifting from being held in a respective one to a respective other of the first and second circular paths 90 and 92. The ring 98 further includes a slot 103 therein to guide the arm 74 of the rod 60.

By reference most particularly to FIG. 3 it will be apparent that upraised from the flange 78 are a plurality or more particularly a pair of guide pins 104 which along with a pair of co-operating slots 106, one in each of the arcuate cams 82 adjacent the centers 88 thereof serve as means for constraining the arcuate cams 88 to move only radially responsive to a shift in rotation rate of the input shaft 13 between normal and overspeed. Thus, rotation of the arcuate cams 82 relative to the shaft 13 is prevented. In the preferred embodiment of the invention as illustrated in FIG. 3, the spring biasing of the cam 82 by the springs 84 is accomplished by using the pair of springs 84 each attached at opposite ends thereof adjacent the mid points 88 of the arcuate cams 82 and held adjacent the mid points of said springs 84 by a pair of holding pins 108 each extending from the flange 78 adjacent ends 86 of the arcuate cams 82. It will be further noted that the adjacent ends 86 of the arcuate cams 82 each include a finger 110 extending therefrom and fitting against a respective one of the holding pins 108. The pair of fingers 110 which extend from the adjacent ends 86 of the arcuate cams 82 together substantially surrounds the respective one of the holding pins 108. It will be further noted that the arcuate cams 82 each include a pair of weights 112 attached inwardly radially thereto relative to the first and second circular paths 90 and 92. This is to ensure that the percentage change in centrifugal force with movement of the weights 112 are maximized through providing a relatively minimal effective radius from the center of gravity of the arcuate cams 82 to the center of the input shaft 13.

Turning now to FIGS. 4 and 5 the structure and operation of the valve 58 will be more apparent. Briefly the valve 58 comprises a bore 114 within a valve body 116. A spool 118 is provided which is movable within the bore 114. A first end 120 of the spool 118 acts against the first end 62 of the rod 60. A passage 122 is provided within the spool 118 from the first end 120 thereof to a second end 124 thereof. An O-ring 126 serves as means providing a sliding generally fluid tight seal between the bore 114 and the spool 118 intermediate the ends 120 and 124 thereof. A cavity 128 within the body 116 communicates with the bore 114 adjacent the second end 124 of the spool 118. A ball 130 is movable within the cavity 128. A first seat 132 is provided for the ball 130 and is formed in the spool 118 adjacent the second end 124 thereof. When the ball 130 sits against the first seat 132 it closes the passage 122 thus defining a normally closed (non-venting) position for the valve 58. This occurs when the second end 124 of the spool 118 extends into the cavity 128 (normal speed conditions). A second seat 134 for the ball 130 is formed in the cavity 128 and serves for closing the bore 114 when the spool 118 does not extend into the cavity 128 (overspeed condition). Means, namely a passage 136 provides flow communication between the cavity 128 and the control means 22. A passage 138 serves as means for flow communicating the cavity 128 with the output clutch 48. Under normal speed conditions (FIG. 4), pressure from the control means 22 passes via the passage 136, the cavity 128 and the passage 138 to the output clutch 48. Under overspeed conditions (FIG. 5), pressure from the passage 136 is shut off by the ball 130 and the output clutch 48 has the pressure therein exhausted via the passage 138, the bore 114 and the passage 122 (which generally exhausts into the transmission). As will be noted by reference to both FIGS. 4 and 5 the spring 64 serves to bias the rod 60 away from the body 116 and against the cam follower 66. This is true in either the position corresponding to a normal rate of rotation of the input shaft 13, namely the position shown in FIG. 4, and in the configuration shown in FIG. 5 which corresponds to input shaft 13 rotating at an overspeed condition.

It will be apparent that a trigger mechanism such as described herein is useful in other operations than to act as a transmission overspeed inhibitor and this invention is meant to cover use of such mechanism in all of its applications. It will be further apparent that the overspeed inhibitor of the invention is useful in other transmissions than that described illustratively above.

While the invention has been described in connection with specific embodiments thereof, it will be understood that it is capable of further modification, and this application is intended to cover any variations, uses or adaptations of the invention following, in general, the principles of the invention and including such departures from the present disclosure as come within known or customary practice in the art to which the invention pertains and as may be applied to the essential features set forth, and as fall within the scope of the invention and the limits of the appended claims.

What is claimed is:

1. A trigger mechanism providing stepwise linear motion responsive to a shaft rotating above a predetermined rate, comprising:

a rotating shaft having a collar thereabout attached to rotate therewith;

a plurality of arcuate cams mounted within said collar to rotate therewith, each normally biased with the ends of the arcs thereof adjacent said collar and the mid points of the arcs thereof spaced away from said collar towards said shaft, said mid points of said arcs being forced centrifugally to adjacent said collar when said shaft rotates above a predetermined rate, each of aid cams having channel means therein, each of said cams fitting against a respective adjacent cam end to end to form a generally circular arrangement thereof and of said channel means, said circular arrangement of said channel means defining a first circular path in said cams at a normal shaft rotation rate up to said predetermined rate a first radial distance from said shaft and a second circular path in said cams at a second radial distance from said shaft above said predetermined shaft rotation rate;

non-rotating cam-follower means having a tang extending therefrom into said first circular path at said normal shaft rotation rate and into said second circular path above said predetermined shaft rotation rate, said cam-follower means being constrained to shift laterally with shifting of said tang from a respective one to a respective other of said first and second circular paths and providing a pair of detent positions separated by a distance generally equal to said lateral shift a first of which is further from said shaft and a second of which is closer to said shaft;

a rod having a first end extending outwardly from said cam-followeer means away from said shaft and a second end contacting a respective one of said first and second detent positions; and means biasing said second end of said rod toward said respective one of said first and second detent positions and thereby indexing said tang in said first circular path at said normal shaft rotation rate and in said second circular path at said predetermined shaft rotation rate.

2. A trigger mechanism as in claim 1, wherein said pair of detent positions of said non-rotating cam-follower means comprise a pair of adjacent indentations in said cam-follower means separated by an apex therebetween.

3. A trigger mechanism as in claim 2, wherein said plurality of arcuate cams comprises a pair thereof and said cams are normally spring biased.

4. A trigger mechanism as in claim 3, wherein said collar is attached to rotate with said shaft by a flange extending radially therefrom and attached to said shaft, said cams sit adjacent said flange, and said flange has extending therefrom a plurality of guide pins which constrain said cams to move radially responsive to a shift in shaft rotation rate between said normal rate and said predetermined rate.

5. A trigger mechanism as in claim 4, wherein the normal spring biasing of said cams is accomplished by a pair of symmetrically placed springs each attached at opposite ends thereof adjacent the mid points of said arcs of said cams, each spring fitting adjacent a mid point thereof over a respective one of a pair of holding pins each of which extends from said flange adjacent the adjacent ends of said cams.

6. A trigger mechanism as in claim 5, wherein said adjacent ends of said cams each include a finger extending therefrom fitting against a respective one of said holding pins, said pair of fingers which extend from said adjacent ends of said cams together substantially surrounding said respective one of said holding pins.

7. A trigger mechanism as in claim 6, wherein said cams each include a pair of weights attached inwardly radially thereto relative to said first and second circular paths.

* * * * *